United States Patent

[11] 3,562,628

[72] Inventor Alfred W. Barber
 Bayside, N.Y. (32-44 Francis Lewis Blvd., Flushing, N.Y. 11358)
[21] Appl. No. 735,849
[22] Filed June 10, 1968
[45] Patented Feb. 9, 1971

[54] CIRCUIT FOR LIMITING THE FIRING OF A SILICON CONTROLLED RECTIFIER TO A LOW ANGLE OF THE INPUT ALTERNATING CURRENT
5 Claims, 3 Drawing Figs.

[52] U.S. Cl. ................................................ 323/22,
 219/413, 219/482, 307/133, 323/24, 331/172
[51] Int. Cl. .................................................. G05f 1/44
[50] Field of Search ........................................... 323/22
 (SCR), (Termatrex), 4, 9, 16—22, 24; 331/172,
 173, 185, 186; 219/413, 482; 307/133

[56] References Cited
UNITED STATES PATENTS

| | | | |
|---|---|---|---|
| 3,349,223 | 10/1967 | Barter | 219/413 |
| 3,277,362 | 10/1968 | Elliott, Jr. | 323/24 |
| 3,372,328 | 3/1968 | Pinckaers | 323/22(SCR) |
| 3,375,428 | 3/1968 | Mitchell | 323/22X(SCR) |
| 3,444,456 | 5/1969 | Codichini | 323/22(SCR) |

*Primary Examiner*—James D. Trammell
*Assistant Examiner*—G. Goldberg
*Attorney*—Alfred W. Barber

ABSTRACT: In a system normally providing random firing signals to a pair of silicon controlled rectifiers, one for each phase of an alternating current source of power, in phase inhibiting pulses are applied to reduce the firing angle to a predetermined maximum.

INVENTOR.
ALFRED W. BARBER
BY
Alfred W. Barber
ATTORNEY

3,562,628

CIRCUIT FOR LIMITING THE FIRING OF A SILICON CONTROLLED RECTIFIER TO A LOW ANGLE OF THE INPUT ALTERNATING CURRENT

BACKGROUND OF THE INVENTION

Description of the Prior Art

Accurately controlling large amounts of alternating current power to a load in accordance with a programming voltage balanced by a temperature-responsive feedback signal from the load requires a highly sensitive and stable control system. One means for carrying out these objectives uses a balanced transformer driven by a low frequency oscillator and receiving the combined program voltage and temperature-responsive feedback signal (from a thermocouple thermally coupled to the load) at the input and providing an output when the input is unbalanced. The output is used to drive a flip-flop which in turn activates an 8 kc. oscillator. A signal from the 8 kc. oscillator is applied to the gates of a pair of back-to-back connected silicon controlled rectifiers (SCR's) connected between an AC power line and the heater load. This system supplies power to the load whenever the program voltage is greater than the feedback voltage from the thermocouple. When the temperature of the heater load reaches the temperature called for by the program voltage, the 8 kc. oscillator is deenergized and the silicon controlled rectifiers are turned off interrupting the power to the heater load.

The heater power system described above turns on and off at random times whenever the input unbalance calls for power. The result is that the SCR's fire at any random point in the input power cycle. If the SCR's fire when the input power cycle is near maximum, a heavy surge of current results which is particularly troublesome if the input power is supplied through an iron-cored line transformer. Saturation of the transformer, line spikes and blown SCR's may result from these heavy current surges.

As an example of the type of control circuit to which the present invention may be applied, reference is made to U.S. Pat. No. 3,105,155.

SUMMARY

In accordance with the present invention the time at which the SCR's are permitted to fire is restricted to a predetermined low angle of the alternating current input power. This is conveniently carried out in the system described above by applying a full wave rectified inhibiting signal to the base of a transistor which is the 8 kc. oscillator transistor thus preventing an 8 kc. firing signal from being generated except at low angles of the alternating current input. Simple control means are provided for adjusting the maximum permissable angle.

BRIEF DESCRIPTION OF THE DRAWING

FIG. 1 includes a balanced input transformer 101 having input signal terminals 112 and 113, drive signal input terminals 114 and 115 and output terminals 116 and 117. This input transformer 101 is constructed so that when driven by low frequency signals across terminals 114 and 115 as from the 35 cycle unijunction transistor oscillator 103 a positive output appears at either output terminal 116 or 117 depending on the input signal across terminals 112 and 113 and the set-point current applied to terminal 117 as by a source of voltage 121 controlled by an adjustable resistor 120. As set forth in U.S. Pat. No. 3,105,155, the set point current can be adjusted so that a positive output appears at terminal 117 when the input exceeds a predetermined value as supplied by a signal from thermocouple 108 connected over leads 109 and 110 and in series with a source of adjustable programming voltage 111.

Figure 1:
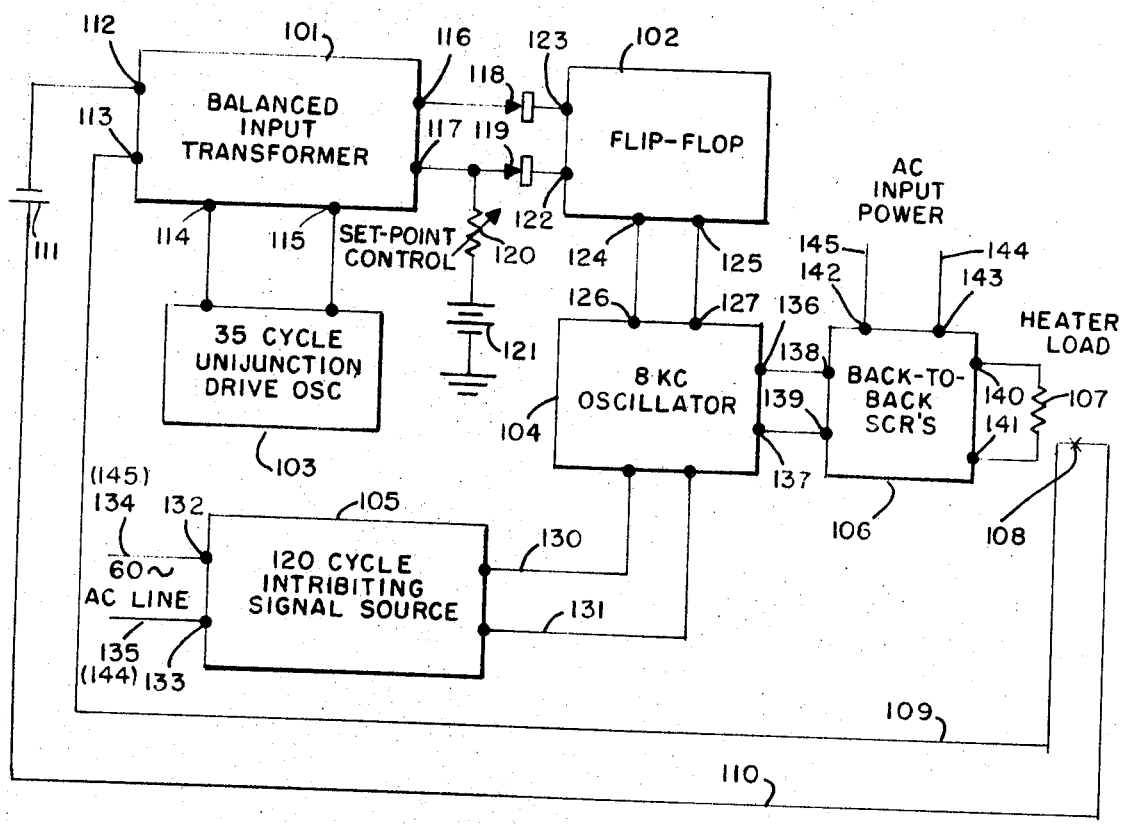
FIG. 1 is a block diagram of one form of the present invention.

Output terminals 116 and 117 are coupled to input terminals 122 and 123 of flip-flop 102 through diodes 118 and 119 both poled to pass positive signals from the input transformer to the flip-flop. Flip-flop 102 is connected to apply a positive bias or signal to output terminals 124 and 125 in response to a positive signal on terminal 117 and no output when terminal 116 is positive. The 8 kc. oscillator 104 is connected over terminals 126 and 127 to flip-flop terminals 124 and 125 in such a manner as to be turned on when a positive output exists on terminals 124 and 125. In this way 8 kc. oscillator 104 is turned on only when terminal 117 is positive which condition exists when the predetermined input conditions to transformer 101 exist as described above. The output of 8 kc. oscillator 104 is coupled from terminals 136 and 137 to the back-to-back silicon controlled rectifiers 106 across terminals 138 and 139. When the 8 kc. oscillator is on, the signal thus applied to the SCR's turns them on supplying power from AC power line 144—145 connected to terminals 142—143 to the heater load 107 connected across terminals 140—141. The power is thus applied to heat the heater load until the temperature reaches such a point as to cause the signal from thermocouple 108 to exceed the program voltage 111 at which point the positive output from transformer 101 switches from terminal 117 to 116 reversing the flip-flop, turning off the 8 kc. oscillator and therefore turning off the SCR's and the power to the load.

The functioning of the system as described so far is random, that is, the SCR's are turned on and off in accordance with the input signal to transformer 101 with no regard as to the instantaneous phase of the input power current.

The present invention comprises means for limiting the turn-on of the SCR's to low phase angles of the input power current. One way in which this can be accomplished is by means of the 120 cycle inhibiting signal source 105 receiving 60 cycle input from the AC input power lines 134 and 135 at terminals 132 and 133 in phase with the AC input power to the SCR's at terminals 142 and 143 and providing a 120 cycle inhibiting signal over leads 130—131 to terminals 128—129 of the 8 kc. oscillator for controlling the point in the alternating power current at which the into which 8 kc. oscillator can be turned on as will be described in detail below.

Figure 2:
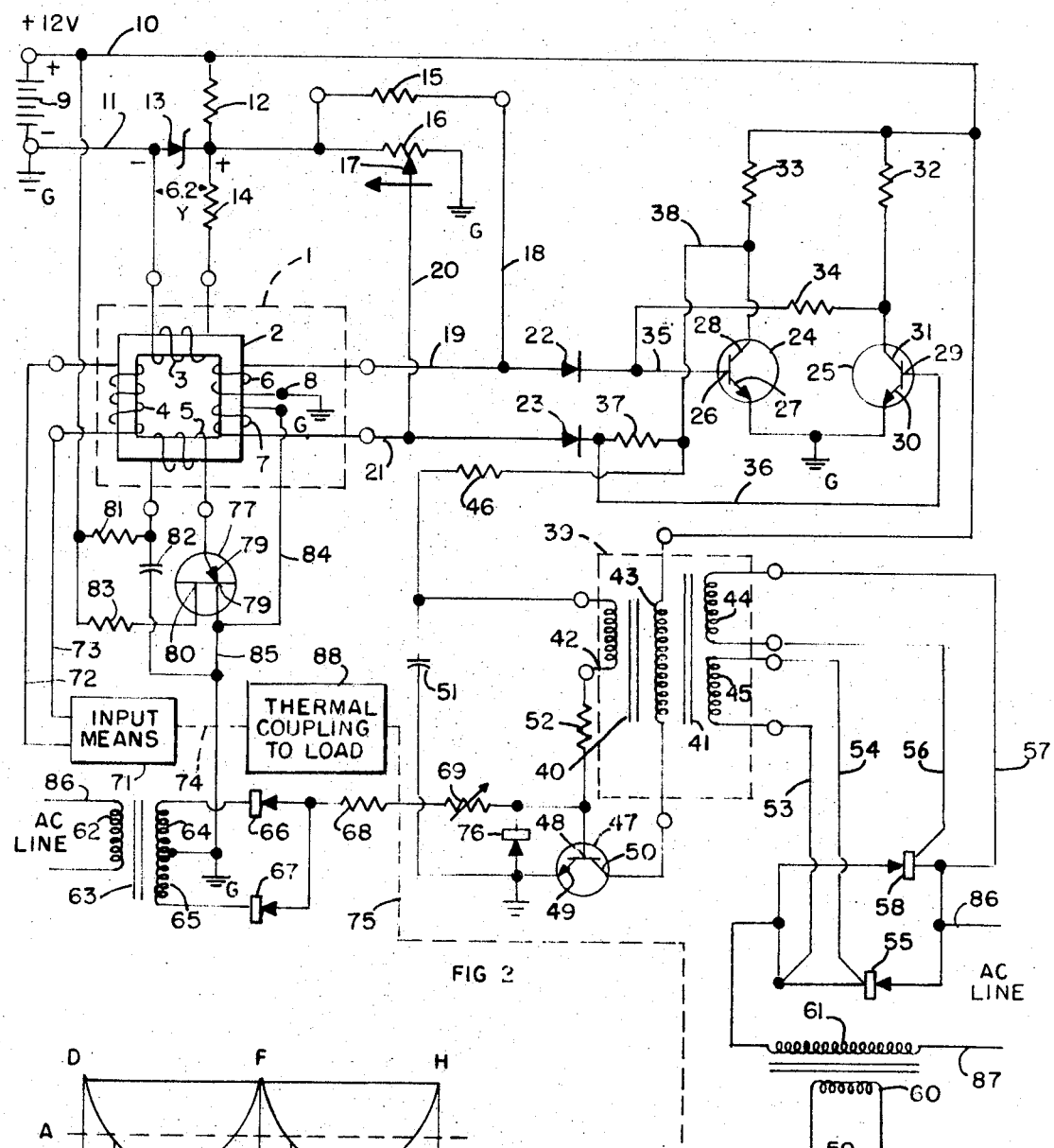
FIG. 2 is a schematic circuit diagram in detail of the form of the present invention shown in FIG. 1.

FIG. 2 shows the circuit details of the form of the invention shown in block form in FIG. 1 and generally described above. Input transformer 1 includes a core 2, bias winding 3, input winding 4, drive winding 5 and output winding 6—7 with center-tap 8 grounded at G. Current is supplied to bias winding 3 from a voltage source represented by, but not limited to, battery 9 connected to a positive lead 10 and a negative lead 11 also grounded at G. A stabilized voltage is provided by zener diode 13 supplied through resistor 12. A stable bias current is provided in bias winding 3 from the stabilized voltage across zener 13 as determined by series resistor 14. This bias current in bias winding 3 is provided for the purpose of setting the point of operation of the various signals on an optimum part of the magnetic characteristics of core 2. Further magnetizing current is applied to core 2 over windings 6 and 7 supplied with current from the stabilized voltage across zener diode 13 through resistor 15 and over leads 18 and 19 through winding 6 to ground G and an opposing current through resistor 16 from adjustable contact 17 over lead 20 to winding 7 to ground G. The net unbalance between these two currents is the "set current" and adjustable arm 17 may be designated the "set point" control. This net unbalance when overcome by the input current in winding 4 causes "turn-on" operation. The turned-on condition is the condition which exists when positive going output signals are present on lead 21 as will be set forth below. The magnetic condition of core 2 is determined by applying probing drive pulses to winding 5 from a suitable source of low frequency pulses such as the unijunction oscillator using unijunction transistor 77. If core 2 is in a balanced condition between set point and input currents, positive going output pulses will be produced across winding 6 and on line 19. However, when the input current exceeds the set point current in effect, positive going pulses will be produced across winding 7 and line 21 will show positive going output pulses. Unijunction transistor 77 feeds winding 5 with low frequency drive pulses as determined by resistor 81 through which charging current flows from positive line 10 to charge capacitor 82. The RC time constant and hence the pulse rate is chosen for a suitable low value, for example, 35 pulses per second. The circuit of this oscillator is completed by resistor 83 applying bias to base 80, the connection between emitter 78 and output winding 5 and connections 84 and 85 between base 79 and one side of capacitor 82 and ground G.

The next step in the operation of the system uses a flip-flop circuit employing transistors 24 and 25. This flip-flop circuit employs transistor 24 having base 26, emitter 27 and collector 28 and transistor 25 having base 29, emitter 30 and collector 31. Collector bias is supplied over lead 10 through collector load resistors 32 and 33 to collectors 31 and 28 respectively. Emitters 27 and 30 are returned directly to ground G. Base 26 is coupled to collector 31 over lead 35 and through resistor 34 and base 29 is coupled to collector 28 over lead 36, through resistor 37 and over lead 38. With these connections it will be seen that when one transistor is on i.e. is conducting, the other transistor is off i.e. nonconducting. The control of this flip-flop is through the two diodes 22 and 23. Positive going pulses on lead 19 pass through diode 22 and turn on transistor 24 and through the flip-flop action turn off transistor 25. Positive going pulses from coil 6 on lead 19 are present in response to drive pulses in coil 5, when the input signal in coil 4 is effectively less than the set point current in coil 7. Under these conditions, the conduction in transistor 24 results in a low potential at collector 28 due to on current drop through resistor 33. This low voltage coupled over lead 38 and through resistor 46 is insufficient to turn on the 8 kc. oscillator incorporating oscillation transformer 39 and transistor 47. As will be more fully described below, nonoscillation of the 8 kc. oscillator provides no turn-on signal to the power controlling SCR's. However, if the input current in coil 4 effectively exceeds or overcomes the set-point current, positive going pulses across coil 7 appear on lead 21 and passing through diode 23 turn on transistor 25 and off transistor 24. Transistor 24 in going off supplied a high positive bias over lead 38 and through resistor 46 to turn on the 8 kc. oscillator and in turn to fire the SCR's supplying power to the heater load.

The 8 kc. oscillator comprises oscillation transformer 39 and transistor 47. Transistor 47 includes base 48, emitter 49 and collector 50. Collector 50 is returned through winding 43 to the source of positive voltage on lead 10. Emitter 49 is returned directly to ground G. Base 48 is connected through resistor 52, winding 42 and back to ground G through capacitor 51 completing an 8 kc. oscillator circuit adapted to oscillate when positive bias is applied to base 48 through resistor 46 as described above in connection with flip-flops 24 and 25. Now, oscillation transformer 39 includes the feedback oscillator windings 42 and 43 and core 40—41 coupling the oscillator windings 42—43 to two output windings 44 and 45 intended for providing output signals suitable for firing two SCR's when the circuit is oscillating.

Output windings 44 and 45 are coupled to the two back-to-back SCR's 55 and 58 across gates to cathodes over leads 53, 54, 56 and 57. Thus, the SCR's are fired whenever the 8 kc. oscillator is on i.e. is oscillating. The SCR's are connected in series between the primary 61 and AC line 86—87 for controlling the heater power to the load 59.

While not intended to limit the present invention, the system of FIG. 2 includes a thermal coupling 88 to the heater load of temperature responsive voltage generating means such as a thermocouple in a degenerative feedback circuit as represented by dotted line 74—75 to input means 71 from heater load 59. The input means 71 may be taken to represent any suitable comparison means program voltage source and circuits to apply to winding 4 over leads 72—73 a signal which when it is of a predetermined polarity and greater than a predetermined level calls for power to the heater load 59. It will now be seen that the system as described so far operates to supply power to heater load 59 in accordance with the program demand and feedback information in a manner which is completely random as far as the AC current on the input line is concerned. The SCR's are fired at the instant more power is required for the heater load. This instant can come anywhere on the AC line cycle and may thus cause trouble by closing the circuit at or near the maximum of the input AC cycle. This random closing of the circuit can be especially troublesome in circuits employing high current line transformers by creating saturation conditions, effective rectification, spikes on the AC line and other undesirable results.

I have found that the problems mentioned above can be eliminated by controlling the points in the AC line voltage at which the SCR's can fire, or in preventing the SCR's from firing at any angle greater than a settable predetermined value. I have also found a simple and effective way to accomplish this result in the circuit or type of circuit described above. This involves the application of a synchronous or line derived inhibiting signal of adjustable amplitude to the circuit generating the random SCR firing signal. In this particular application the synchronous inhibiting signal is applied to the 8 kc. transistor oscillator as described in detail below.

Figure 3:
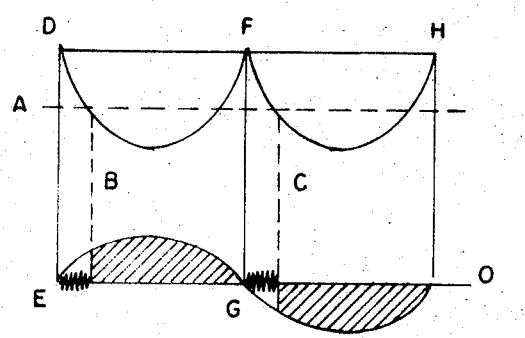
FIG. 3 is a graphical illustration of one mode of operation of the present invention.

The AC line voltage, coupled to the AC line 86—87 supplying power to the heater load 59 (or synchronized with it), is applied to a full wave rectifier including a line transformer 62, 63, 64 and 65. Primary winding 62 is connected to the line 86—87 and secondary windings 64—65 with center-tap grounded at G applies equal and oppositely phased AC to rectifiers 66 and 67 both connected to supply negative half cycles of rectified current through amplitude control resistors 68 and 69 to base 48 of 8 kc, oscillator transistor 47. These negative half cycles are shown in the upper part of FIG. 3 as D-F-H. The oscillation of transistor 47 depends on a positive bias on base 48 so that at some level as A on FIG. 3 a negative bias will prevent turn-on of the oscillator and in consequence will prevent firing of the SCR's. The amplitude of the negative half-cycle signals may be adjusted by varying the resistance of variable resistor 69 so that the level A may be varied from 90° down to a very low angle. The lower curves of FIG. 3 represent the times of firing of the SCR's at E and G with this control circuit. In effect a synchronous low phase angle control has been provided. In order to limit the maximum amplitude of control signal on base 48 to a safe value, a diode such as diode 76 may be connected from base 48 to ground G.

While only one form of the present invention has been shown in detail, many modifications will be apparent to those skilled in the art and within the spirit and scope of the invention as set forth, in particular, in the appended claims.

I claim:

1. A low frequency power control device including in combination a power transformer including a primary for receiving power from a low frequency power source and a secondary, utilization means connected to said secondary, signal controlled semiconductor means connected in series with said primary for conductively controlling the power to said primary, a transistor oscillator coupled to control said semiconductor means, and means for initiating oscillation in said transistor oscillator in accordance with a requirement for power in said utilization means; and the improvement which includes low frequency responsive means coupled between said primary and said transistor oscillator for inhibiting said oscillator over the portion of each half cycle of primary power voltage lying above zero and a predetermined low angle of said half cycle.

2. A low frequency power control device as set forth in claim 1 wherein the last said means includes full wave rectifying means for providing an inhibiting signal in response to each half cycle of low frequency input power to said primary.

3. A low frequency power control device as set forth in claim 1 wherein the last said means includes adjustable series impedance means.

4. In a low frequency alternating current power control device, the combination of means for receiving low frequency alternating current power; load means to be supplied with alternating current power; silicon controlled rectifier means coupled between said receiving means and said load means for controlling power flow to said load means; asynchronous transistor oscillator means for firing said silicon controlled rectifier means; and inhibiting means coupled between said transistor oscillator and said receiving means for preventing the firing of said silicon controlled rectifier means in the presence of power voltage at said receiving means lying above zero and a predetermined low angle of each half cycle of said power.

5. A low frequency alternating current power control device as set forth in claim 4 where said inhibiting means includes full wave rectifier means coupled to said receiving means and to said oscillator means.